(12) United States Patent
Li et al.

(10) Patent No.: US 8,780,081 B2
(45) Date of Patent: Jul. 15, 2014

(54) TOUCH PANEL

(75) Inventors: Pei-Sheng Li, Hsinchu (TW); Suei-Shih Syu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 163 days.

(21) Appl. No.: 13/572,708

(22) Filed: Aug. 13, 2012

(65) Prior Publication Data

US 2013/0155006 A1 Jun. 20, 2013

(30) Foreign Application Priority Data

Dec. 16, 2011 (TW) .............................. 100146881 A

(51) Int. Cl.
*G06F 3/044* (2006.01)

(52) U.S. Cl.
USPC ............................ 345/174; 345/173; 345/179

(58) Field of Classification Search
USPC ....................................................... 345/174
See application file for complete search history.

(56) References Cited

U.S. PATENT DOCUMENTS

| | | | |
|---|---|---|---|
| 5,220,324 A * | 6/1993 | Morita | 341/32 |
| 6,417,846 B1 * | 7/2002 | Lee | 345/173 |
| 7,084,933 B2 | 8/2006 | Oh et al. | |
| 7,903,094 B2 * | 3/2011 | Katsuhito et al. | 345/173 |
| 8,421,771 B2 * | 4/2013 | Fukushima | 345/174 |
| 2004/0189587 A1 * | 9/2004 | Jung et al. | 345/102 |
| 2009/0102814 A1 | 4/2009 | Lin et al. | |
| 2013/0049749 A1 * | 2/2013 | Mohan et al. | 324/252 |

* cited by examiner

*Primary Examiner* — Van Chow
(74) *Attorney, Agent, or Firm* — Jianq Chyun IP Office

(57) ABSTRACT

A touch panel includes a substrate, plural first coils, plural second coils, plural sensing pads, plural connection lines, and a control circuit. The first coils, the second coils, the sensing pads and the connection lines are configured on the substrate. Each first coil has a first connection portion and a first coil portion connected to the first connection portion and extending along a first direction. Each second coil has a second connection portion and a second coil portion connected to the second connection portion and extending along a second direction. Plural overlapping regions are defined by areas occupied by the first coil portions and the second coil portions on the substrate, and the sensing pads are located in the overlapping regions. The connection lines are respectively connected to the sending pads. The connection lines, the first connection portions and the second connection portions are connected to the control circuit.

10 Claims, 2 Drawing Sheets

TOUCH PANEL

CROSS-REFERENCE TO RELATED APPLICATION

This application claims the priority benefit of Taiwan application serial no. 100146881, filed on Dec. 16, 2011. The entirety of the above-mentioned patent application is hereby incorporated by reference herein and made a part of this specification.

BACKGROUND OF THE INVENTION

1. Field of the Invention

The present invention generally relates to a touch panel, in particular, to a touch panel having diversified functions.

2. Description of Related Art

In recent years, various electronic products are continuously developed towards simple operation, small volume, and large screen size. Particularly, portable electronic products have more strict requirements on the volume and the screen size. Therefore, in many electronic products, a touch panel and a liquid crystal display panel are integrated, so as to save a space required by a keyboard or manipulation press keys, so that an area in which the screen may be configured is enlarged.

Generally, the touch panel may be approximately divided into a resistance touch panel, a capacitance touch panel, an optical touch panel, an acoustic wave touch panel, and an electromagnetic touch panel according to different sensing manners. The capacitance touch panel has advantages of having quick action time, good reliability, and high durability, so as to be widely used in the electronic products. In addition, a plurality of electrodes is disposed on the touch panel to realize a touch sensing circuit with column and row configuration, so that in addition to providing a touch sensing function, the touch panel may also be used to realize other functions, so as to diversify functions of the electronic device without increasing a volume.

SUMMARY OF THE INVENTION

An embodiment of the present invention provides a touch panel, which includes a substrate, a plurality of first coils, a plurality of second coils, a plurality of sensing pads, a plurality of connection lines, and a control circuit. The first coils are configured on the substrate. Each first coil has a first connection portion and a first coil portion connected to the first connection portion and extending along a first direction. Areas occupied by any two neighboring first coil portions on the substrate are partially overlapped. The second coils are configured on the substrate. Each second coil has a second connection portion and a second coil portion connected to the second connection portion and extending along a second direction. The first direction intersects the second direction. Areas occupied by any two neighboring second coil portions on the substrate are partially overlapped. The sensing pads are configured on the substrate. A plurality of overlapping regions is defined by areas occupied by the first coil portions and the second coil portions on the substrate, and the sensing pads are located in the overlapping regions. The connection lines are configured on the substrate, and respectively connected to the sensing pads. The connection lines, the first connection portions of the first coils, and the second connection portions of the second coils are connected to the control circuit.

Based on the above mentioned, a touch panel of the present invention has sensing pads and coils, so that in addition to having functions of a capacitance touch panel, the touch panel provides a finger touch function, and also has functions of an electromagnetic touch panel, that is, a function of receiving induction of an electromagnetic pen.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
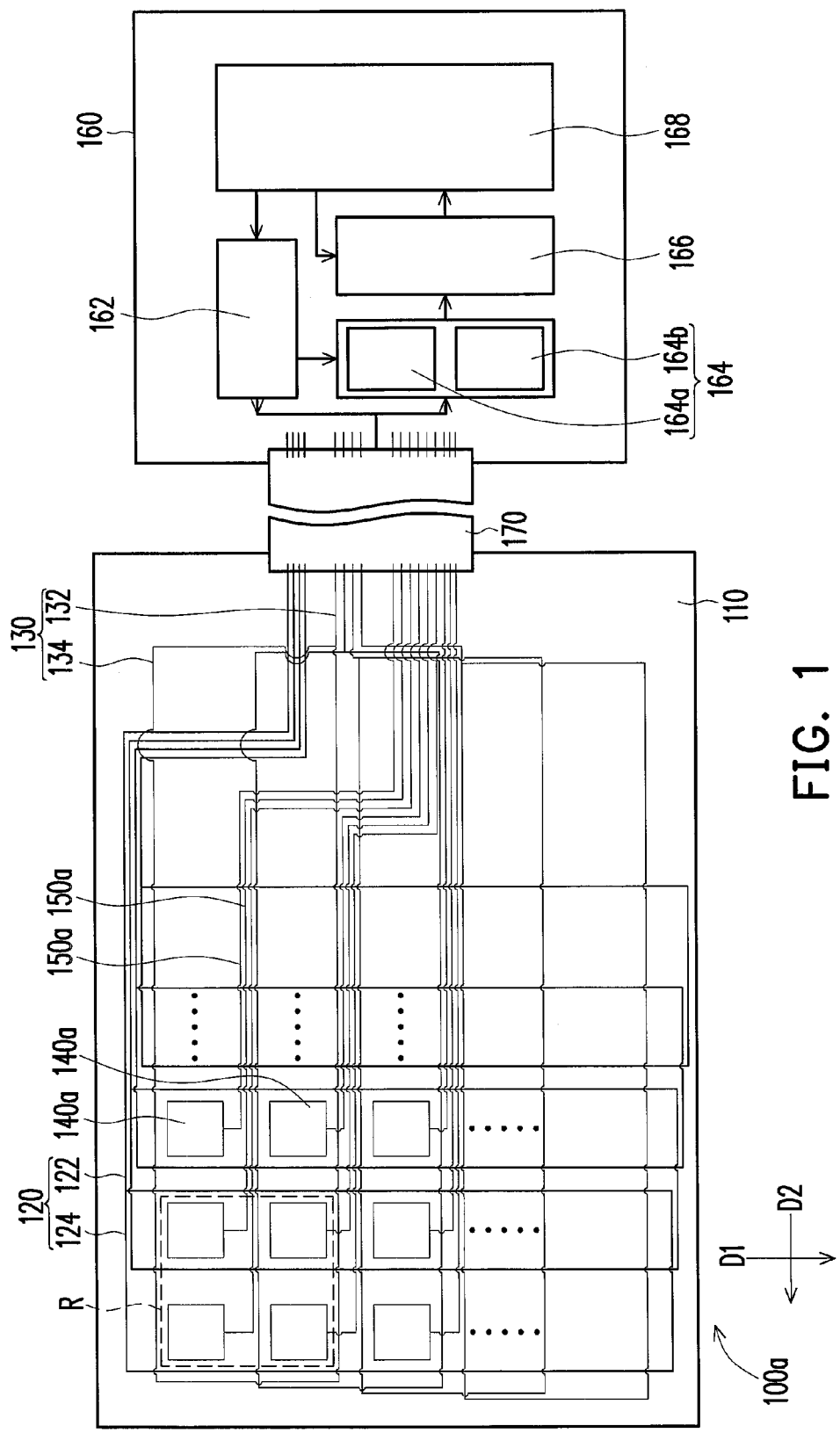
FIG. 1 is a schematic top view of a touch panel according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic top view of a touch panel according to an embodiment of the present invention. Referring to FIG. 1, in this embodiment, the touch panel 100a includes a substrate 110, a plurality of first coils 120, a plurality of second coils 130, a plurality of sensing pads 140a, a plurality of connection lines 150a, and a control circuit 160.

In detail, the first coils 120 are configured on the substrate 110, in which each first coil 120 has a first connection portion 122 and a first coil portion 124 connected to the first connection portion 122 and extending along a first direction D1. The second coils 130 are configured on the substrate 110, in which each second coil 130 has a second connection portion 132 and a second coil portion 134 connected to the second connection portion 132 and extending along a second direction D2. Here, the first direction D1 intersects the second direction D2, and more particularly, the first coil portions 124 and the second coil portions 134 are vertically arranged. In addition, areas occupied by any two neighboring first coil portions 124 on the substrate 110 are partially overlapped, and areas occupied by any two neighboring second coil portions 134 on the substrate 110 are partially overlapped.

The sensing pads 140a of this embodiment are configured on the substrate 110, in which a plurality of overlapping regions R is defined by areas occupied by the first coil portions 124 and the second coil portions 134 on the substrate 110, and the sensing pads 140a are located in the overlapping regions R. That is to say, the areas occupied by the first coil portions 124 on the substrate 110 and the areas occupied by the second coil portions 134 on the substrate 110 are partially overlapped, and the overlapped parts are the overlapping regions R. The sensing pads 140a are located in the overlapping regions R and do not contact the first coils 120 or the second coils 130. The connection lines 150a are configured on the substrate 110, and are respectively connected to the sensing pads 140a. The connection lines 150a, the first connection portions 122 of the first coils 120, and the second connection portions 132 of the second coil 130 may be connected to the control circuit 160 through a flexible circuit board 170. Here, the control circuit 160 includes a driving circuit 162, a comparing circuit 164, a converting circuit 166, and a processor 168, in which the comparing circuit 164 is coupled to the driving circuit 162 and at least includes a capacitance comparator 164a and an electromagnetic comparator 164b, the converting circuit 166 is coupled to the comparing circuit 164, and the processor 168 is coupled to the converting circuit 166 and the driving circuit 162.

In this embodiment, a material of the substrate 110 is, for example, acryl, polycarbonate (PC), polyethylene terephthalate (PET), or polyimide (PI). A material of the first coils 120, the second coils 130, the sensing pads 140a, and the connection lines 150a is, for example, copper, iron, silver, carbon nano-tube, or other suitable electrical conductive materials.

It should be mentioned that although a shape of the first coil portions 124 and the second coil portions 134 mentioned here is particularly rectangle, the present invention does not limit the shape of the first coil portions 124 of the first coils 120 and the second coil portions 134 of the second coils 130. However, in other not shown embodiments, the shape of the first coil portions 124 and the second coil portions 134 may be circle or other polygons, which is still the technical solution capable of being adopted by the present invention without departing from the protection scope of the present invention. Similarly, although a shape of the sensing pads 140a is particularly rectangle, the present invention does not limit the shape of the sensing pads 140a. However, in other not shown embodiments, the shape of the sensing pads 140a may be circle, rhomboid, triangle, or other polygons, which is still the technical solution capable of being adopted by the present invention without departing from the protection scope of the present invention.

The touch panel 100a of this embodiment has the first coils 120 and the second coils 130 being vertically arranged and the sensing pads 140a, so before a user contacts the touch panel 100a by using a finger (not shown), the processor 168 of the control circuit 160 controls the driving circuit 162 to generate a harmonic wave with a fixed frequency to the sensing pads 140a, and when the user contacts the touch panel 100a by using the finger (not shown), the sensing pads 140a of the touch panel 100a generates change of a capacitance on a position contacted by the finger to result in change of the harmonic wave and transmit the change to the comparing circuit 164, then the change is compared and converted by the converting circuit 166 to a digital signal, and the digital signal is transmitted to the processor 168, so as to obtain the position contacted by the finger through operation. The above-mentioned is functions of a capacitance touch panel. Further, if the user contacts the touch panel 100a by using an electromagnetic pen (not shown), the electromagnetic pen may be considered as a signal sending end, and the first coils 120 and the second coils 130 may be considered as a signal receiving end. When the electromagnetic pen approaches or contacts the first coils 120 and the second coils 130, a magnetic flux is changed, and the control circuit 160 may calculate the position contacted by the electromagnetic pen through change of the magnetic flux. In brief, in addition to the functions of the capacitance touch panel, the touch panel 100a of this embodiment provides a finger touch function, and also has functions of an electromagnetic touch panel, that is, a function of receiving induction of an electromagnetic pen.

It should be noted that in the following embodiments, element numerals and a part of content of the above embodiment are used, in which the same numerals are used to represent the same or similar elements, and description of the same technical content is omitted. For the description of the omitted part, please refer to the above embodiment, and description is not given in the following embodiments.

Figure 2:
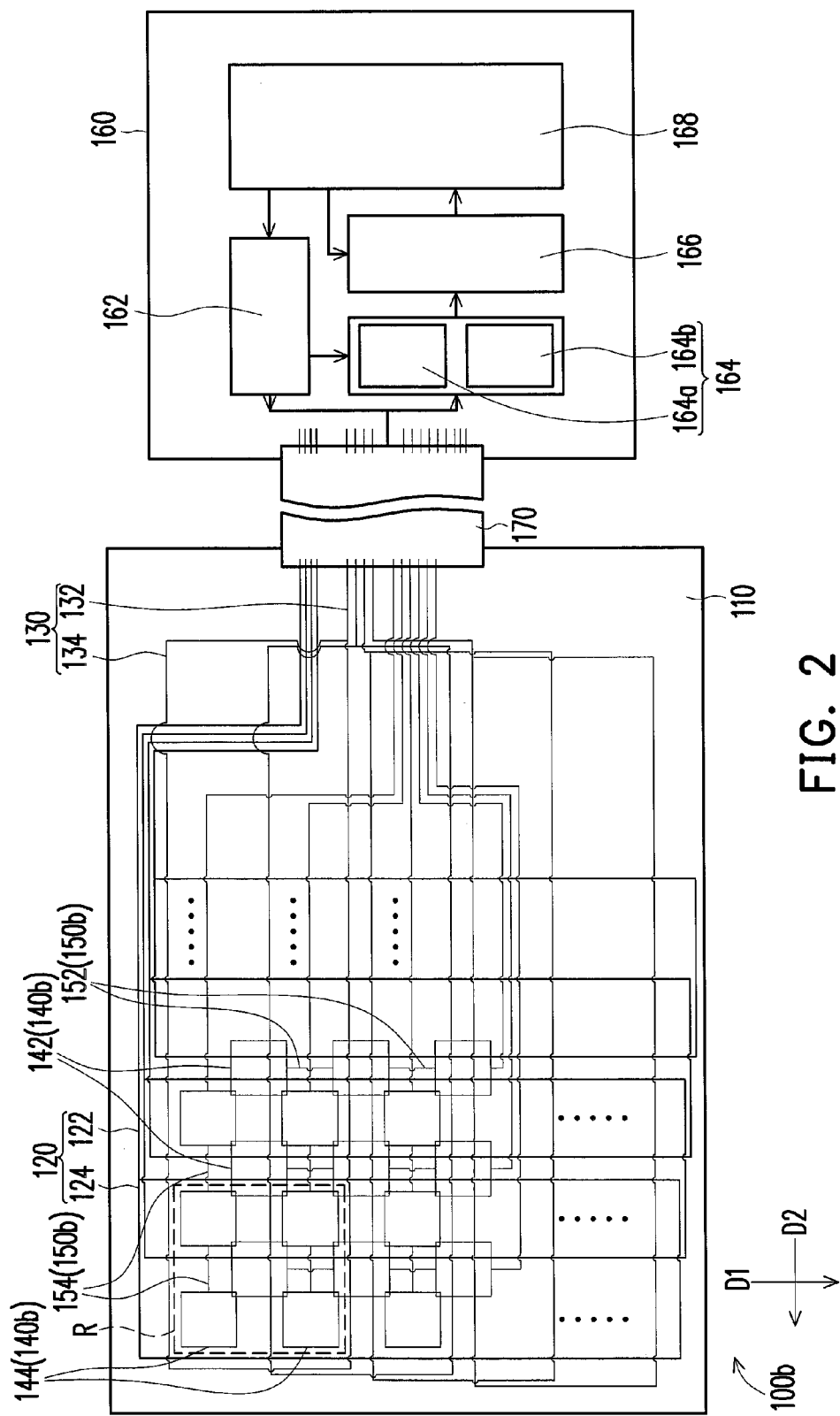
FIG. 2 is a schematic top view of a touch panel according to another embodiment of the present invention.

FIG. 2 is a schematic top view of a touch panel according to another embodiment of the present invention. It should be noted that for ease of description, an insulating layer used to insulate first sending pads 142 and second sensing pads 144 is omitted in FIG. 2. Referring to FIG. 2, the touch panel 100b of this embodiment is similar to the touch panel 100a of FIG. 1, except that sensing pads 140b of this embodiment include a plurality of first sensing pads 142 and a plurality of second sensing pads 144, and connection lines 150b include a plurality of first connection lines 152 and a plurality of second connection lines 154.

In detail, each first connection line 152 is located between two neighboring first sensing pads 142, so that the first connection line 152 serially connects the first sensing pads 142 along a first direction D1, so as to form a sensing serial. Each second connection line 154 is located between two neighboring second sensing pads 144, so that the second connection line 154 serially connects the second sensing pads 144 along a second direction D2, so as to form another sensing serial. Here, the sensing serial on the first direction D1 and another sensing serial on the second direction D2 are vertical to each other, but in other embodiments, the first direction D1 may intersect the second direction D2 at an angle being not equal to 90 degrees. In addition, the first sensing pads 142 and the second sensing pads 144 are alternatively arranged on the substrate 110 to form an array, and the first sensing pads 142 and the second sensing pads 144 form crossed sensing serials under connection of the first connection lines 152 and the second connection lines 154. When the first connection lines 152 and the second connection lines 154 are in an electrically connected state, the touch panel 100b may realize a touch sensing function.

To sum up, a touch panel of the present invention has sensing pads and coils, so that in addition to having functions of a capacitance touch panel, the touch panel provides a finger touch function, and also has functions of an electromagnetic touch panel, that is, a function of receiving induction of an electromagnetic pen.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
   a substrate;
   a plurality of first coils, configured on the substrate, and each first coil comprising a first connection portion and a first coil portion connected to the first connection portion and extending along a first direction, wherein areas occupied by any two neighboring first coil portions on the substrate are partially overlapped;
   a plurality of second coils, configured on the substrate, and each second coil comprising a second connection portion and a second coil portion connected to the second connection portion and extending along a second direction, wherein the first direction intersects the second direction, and areas occupied by any two neighboring second coil portions on the substrate are partially overlapped;
   a plurality of sensing pads, configured on the substrate, wherein a plurality of overlapping regions is defined by areas occupied by the first coil portions and the second coil portions on the substrate, and the sensing pads are located in the overlapping regions;

a plurality of connection lines, configured on the substrate, and respectively connected to the sensing pads; and a control circuit, wherein the connection lines, the first connection portions of the first coils, and the second connection portions of the second coils are connected to the control circuit.

2. The touch panel according to claim 1, wherein a shape of the first coil portions and the second coil portions comprises rectangle or circle.

3. The touch panel according to claim 1, wherein a shape of the sensing pad comprises rectangle, circle, rhomboid, or triangle.

4. The touch panel according to claim 1, wherein the control circuit comprises:

a driving circuit;

a comparing circuit, coupled to the driving circuit;

a converting circuit, coupled to the comparing circuit; and a processor, coupled to the converting circuit and the driving circuit.

5. The touch panel according to claim 4, wherein the comparing circuit at least comprises a capacitance comparator and an electromagnetic comparator.

6. The touch panel according to claim 1, wherein the sensing pads comprise a plurality of first sensing pads and a plurality of second sensing pads, the connection lines comprise a plurality of first connection lines and a plurality of second connection lines, each first connection line serially connects the first sensing pads along the first direction, and each second connection line serially connects the second sensing pads along the second direction.

7. The touch panel according to claim 1, wherein a material of the substrate comprises acryl, polycarbonate (PC), polyethylene terephthalate (PET), or polyimide (PI).

8. The touch panel according to claim 1, wherein a material of the first coils and the second coils comprises copper, iron, silver, or carbon nano-tube.

9. The touch panel according to claim 1, wherein a material of the sensing pads comprises copper, iron, silver, or carbon nano-tube.

10. The touch panel according to claim 1, wherein a material of the connection lines comprises copper, iron, silver, or carbon nano-tube.

* * * * *